US006951396B2

United States Patent
Casebier

(10) Patent No.: US 6,951,396 B2
(45) Date of Patent: Oct. 4, 2005

(54) SYSTEM AND METHOD FOR PREVENTION OF WATER CONDENSATION ON HARD SURFACES

(76) Inventor: Kenneth Casebier, 6643 Kentwood Bluffs Dr., Los Angeles, CA (US) 90045

( * ) Notice: Subject to any disclaimer, the term of this patent is extended or adjusted under 35 U.S.C. 154(b) by 0 days.

(21) Appl. No.: 10/878,876

(22) Filed: Jun. 28, 2004

(65) Prior Publication Data

US 2005/0002100 A1 Jan. 6, 2005

Related U.S. Application Data

(63) Continuation of application No. 10/259,931, filed on Sep. 30, 2002, now abandoned.

(51) Int. Cl.[7] ................................................. G02B 1/10
(52) U.S. Cl. ...................................... 359/507; 359/509
(58) Field of Search ................................ 359/507, 509, 359/512, 513, 514; 523/169

(56) References Cited

U.S. PATENT DOCUMENTS

| 162,777 A | 5/1875 | Starr |
|---|---|---|
| 770,106 A | 9/1904 | Prahar |
| 1,075,098 A | 10/1913 | Gray |
| 3,867,175 A | 2/1975 | Dornite |
| 3,908,218 A | 9/1975 | Dishi |
| 4,159,883 A | 7/1979 | Mizell |
| 4,489,352 A | 12/1984 | Kobayashi et al. |
| 4,789,262 A | 12/1988 | Sanchez |
| 5,173,804 A | 12/1992 | Dogey |
| D341,030 S | 11/1993 | Jamieson |
| 5,705,470 A | 1/1998 | Faris |
| 6,352,758 B1 * | 3/2002 | Huang et al. ................ 428/143 |
| 2002/0090516 A1 * | 7/2002 | Loshak et al. ............... 428/412 |
| 2003/0017303 A1 * | 1/2003 | Shindo et al. ............... 428/141 |

FOREIGN PATENT DOCUMENTS

WO  WO 01/73483 A1  10/2001

* cited by examiner

Primary Examiner—Mark A. Robinson
(74) Attorney, Agent, or Firm—Frederick Gotha

(57) ABSTRACT

A reflecting or transparent member such as a shower mirror having a hard surface is striated with a striating member sufficiently so that the surface is finely striated. The striating member has an abrasive surface that has a concentration of abrasives in the range of 100 to 500 grit. After the surface is striated, water is applied to the surface and the water coheres to the striations forming a thin lamina or sheet of water. The thin lamina prevents the condensation of water vapor on the surface when the temperature of the ambient air adjacent the surface falls below the dew-point.

20 Claims, 1 Drawing Sheet

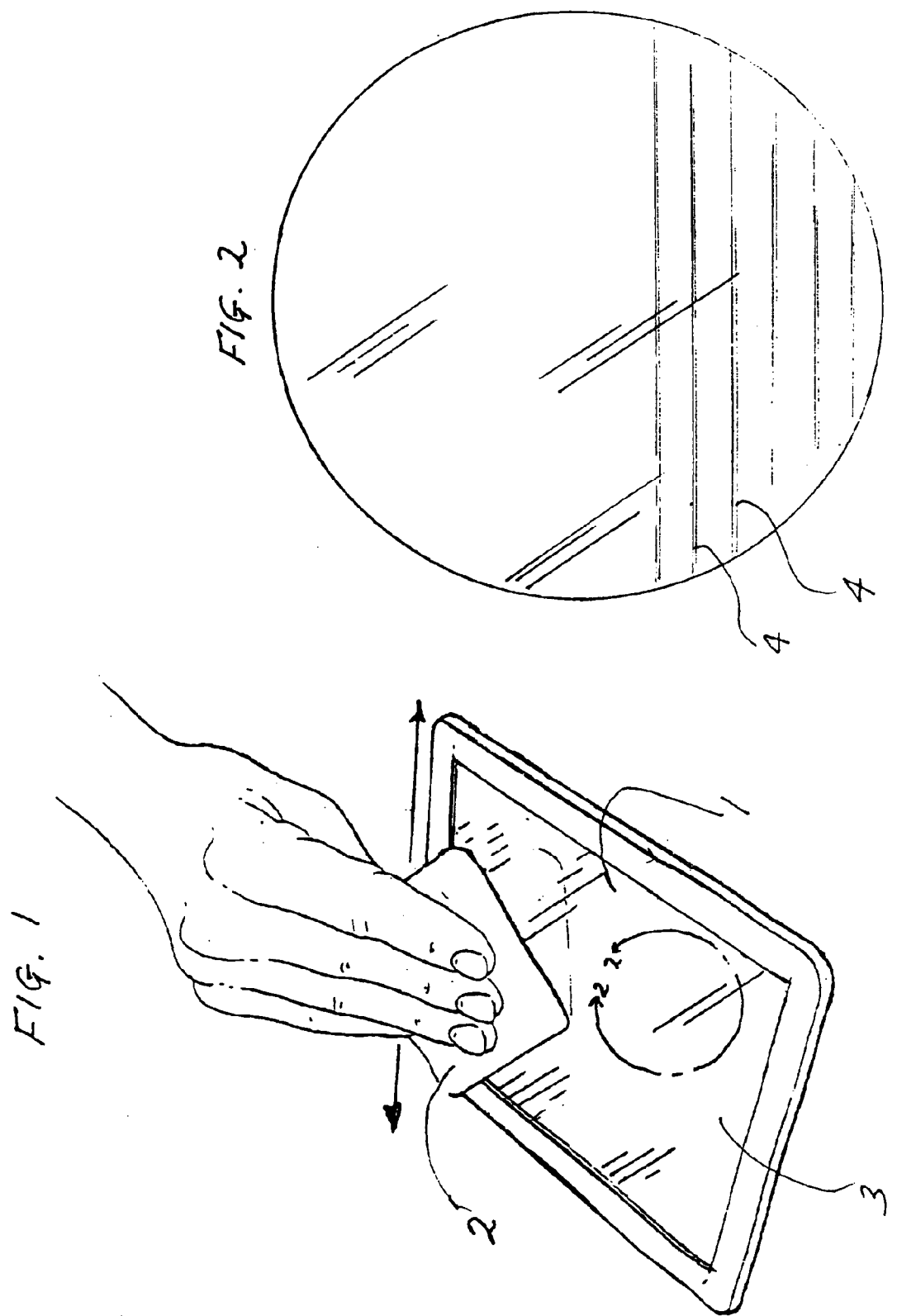

SYSTEM AND METHOD FOR PREVENTION OF WATER CONDENSATION ON HARD SURFACES

Continuation of prior application Ser. No. 10/259,931 filed Sep. 30, 2002 now abandoned.

FIELD OF THE INVENTION

This invention relates to a system and method for preventing water vapor from condensing on a hard surface when the temperature adjacent the surface is below the dew-point.

BACKGROUND OF THE INVENTION

Water vapor condenses on hard surfaces such as glass, plastic, and metal when the temperature of the air adjacent the surface falls below the dew-point. This phenomenon is seen to occur quite commonly on objects such as windows, bathroom mirrors, shower mirrors, eyeglass lens', scuba diving goggles, and automobile windshields. There are numerous other such objects in everyday occurrences where this phenomenon is observed; however, the aforementioned are most commonly experienced and representative of surfaces that require immediate removal of the condensation in order for the object to have utility.

In the prior art, chemical compounds had been developed to coat hard reflecting surfaces such as mirrors to limit and prevent water vapor from condensing on the surface and hence preclude a fogging condition on the surface. In some instances the compounds were sprayed on the surface as the fog condition was occurring and usually adversely affected the image reflected from the surface. Wiping a surface after condensation occurs or splashing the surface with water will temporarily prevent continued fogging; however, splashed water tends to bead or form droplets on the surface and consequently distorts or adversely affects any reflected image or the ability to see through the surface if it is transparent. Heating devices were also used in the prior art to heat the surface and thus maintain the temperature adjacent the surface above the dew-point to prevent condensation of the water vapor ambient the surface. Such devices are generally impractical and expensive.

The present invention is directed toward striating a hard surface member with very fine striations barely visible to the eye. The striations may be machined into the surface, integrally molded, or wiped unto the surface with abrasives. It has been found that when water is applied to such a surface, the water coheres to the striations and forms a thin lamina or sheet of water over the surface that prevents the condensation of water on the surface when the temperature adjacent the surface is below the dew-point. By using inexpensive commercially available abrasive hand pads or sandpaper, one can easily and inexpensively striate a hard surface member having a reflecting surface such as a shower mirror or bathroom mirror, apply water to the surface and thus prevent the condensation of water vapor or fogging on the surface of the mirror.

SUMMARY OF THE INVENTION

There is provided therefore a system and method for preventing the condensation of water vapor on a hard surface such as glass, plastic, or metal when the temperature adjacent the surface is below the dew-point.

The present invention relates to a reflective or transparent member having a hard surface that may be striated or grooved. The striations are very fine and barely visible. They may be molded integrally with the surface, machined into the surface, or formed on the surface through the use of abrasives. Preferably the striations should be in the range of 180 to 500 per inch which is the equivalent of a grit size of 180–500 as measured by the ANSI/CAMI standard. In the case of abrasives, the abrasive granules may be coated to a cloth, paper, or fiber backing, or film having a backing such as polyester film or a combination thereof. The striations may also be made by abrasive hand pads preferably with a nylon filament surface having a grit equivalent in the range of 150 to 500.

In one embodiment, the hard surface member is made of glass and has a hard reflecting surface. Other embodiments include a member that is transparent. The preferred hard reflecting surface of this invention is a shower or bathroom mirror. Other embodiments of such a mirror include mirrors made of plastic or metal or a combination thereof. In yet another embodiment, the reflecting surface may be transparent glass or plastic. When the striations are imbedded into the hard surface with an abrasive, the preferred striating member is a hand pad having a nylon filament surface with an equivalent grit size in the range of 150 to 500. The striating member may also consist of abrasives coated to cloth or paper such as sandpaper having a grit size in the range of 100 to 500. The abrasives may be aluminum oxide, silicon carbide, garnet, ceramic, or other abrasives of sufficient hardness to striate the hard reflecting or transparent surface member.

In the method of this invention, the reflecting surface may be striated when the surface is either wet or dry by wiping the surface with an abrasive or machining the surface with abrasives having a grit range preferably in the range of 150–500 grit. With a grit size less than 150, the striations on the surface may be visible; however, water applied to a striated surface of 100 grit will form a lamina or sheet on the surface that prevents water vapor from condensing on the surface when the temperature adjacent the surface is below the dew-point. The lamina is formed by applying water to the striated surface where the water coheres to the striations. When the lamina or thin water sheet forms, the surface water does not drain or bead and water vapor will not condense it.

BRIEF DESCRIPTION OF THE DRAWINGS

FIG. 1 illustrates a hard reflective surface member being striated by an abrasive hand pad.

FIG. 2 is a magnified view of the surface enclosed within the line 2—2.

DETAILED DESCRIPTION

The present invention is illustrated in FIG. 1. As can be seen in FIG. 1, a hard surface member 1 is striated or grooved by an abrasive member 2 by rubbing or wiping the abrasive member across the surface 3 of the hard surface member 1. The surface 3 illustrated in FIG. 1 is a reflecting surface or mirror. The striations or grooves 4 are shown magnified in FIG. 2 which is a magnified view of the surface area enclosed by the line 2—2. Although the striations appear to be parallel in FIG. 2, they may extend across the reflecting surface in many directions and may intersect innumerable times. The direction of rubbing or wiping the abrasive member as shown by the line A—A in FIG. 1 may be vertical, horizontal, or a combination of directions. FIG. 2 is for illustrative purposes to show that the surface 3 is striated with very fine grooves. When water is applied to a finely striated surface, it has been found that the water coheres to the striations and forms a thin lamina or sheet on the surface. The lamina does not drain or bead the surface and the surface does not fog when the temperature adjacent the surface falls below the dew-point. The dew-point is the temperature below which water vapor in the ambient air condenses.

In the preferred embodiment of this invention, hard surface member 1 is a glass mirror and abrasive member 2 is a hand pad having an abrasive surface composed of nylon filaments. The hard surface member 1 may be made of a metal or plastic; and the abrasives of the abrasive member 2 are of a hardness which is greater than the hardness of surface 3. Sandpaper having a grit size in the range of 100–500 grit (ANSI/CAMI) will produce striations on surface 3 that are very fine and barely visible. Other abrasives may also be used that are coated to cloth such as aluminum oxide, silicon carbide, garnet, ceramic or other abrasives of sufficient hardness to striate surface 3.

In the method of this invention, a hard surface member 1, which may be transparent, is striated with an abrasive material having a grit size in the range of 100–500 grit. The striations could also be machined into surface 3 or integrally molded with hard surface member 1. After being striated, the surface is wetted with water which forms a thin lamina or sheet of water by cohering to the striations. Thus, when the temperature of the air adjacent the striated surface drops below the dew-point, water vapor will not condense on the lamina and fog the surface.

While I have shown and described embodiments of a system and method for preventing water vapor to condense and fog a surface, it is to be understood that the system and method are subject to many modifications without departing from the scope and spirit of the claims as recited herein.

I claim:

1. An anti-fogging system for preventing condensation of water vapor on a reflecting surface that fogs the reflecting surface when the temperature adjacent the reflecting surface is below the dew point comprising:
   (a) a mirror having a reflecting surface of sufficient hardness to permit said reflecting surface to be striated such that upon wetting said reflecting surface with water said water will cohere to said striations and form a thin lamina of water on said reflecting surface; and
   (b) a striating member having surface abrasives of greater hardness than said reflecting surface such that upon rubbing said striating member upon said reflecting surface said reflecting surface will be striated whereby upon wetting said reflecting surface with water said water will cohere to said striations and form a thin lamina of water on said reflecting surface thereby preventing water vapor to condense on said reflecting surface when the temperature adjacent said reflecting surface is below the dew-point.

2. The system recited in claim 1 where said reflecting surface is a rigid glass surface.

3. The system recited in claim 2 where said surface abrasives of said striating member are in the range of 100 to 500 grit.

4. The system recited in claim 3 where said surface abrasives may be selected from the abrasive minerals group consisting of aluminum oxide, silicon carbide, ceramic and garnet.

5. The system recited in claim 3 where said surface abrasives are nylon filaments.

6. The system recited in claim 1 where said reflecting surface is a metal surface.

7. The system recited in claim 6 where said surface abrasives of said striating member are in the range of 100 to 500 grit.

8. The system recited in claim 7 where said surface abrasives are nylon filaments.

9. The system recited in claim 1 where said reflecting surface is a plastic surface.

10. The system recited in claim 9 where said surface abrasives of said striating member are in the range of 100 to 500 grit.

11. The system recited in claim 10 where said surface abrasives may be selected from the abrasive minerals group consisting of aluminum oxide, silicon carbide, ceramic and garnet.

12. A method for preventing condensation of water vapor on a reflecting surface of a mirror that will fog the reflecting surface of the mirror when the temperature of the reflecting surface is below the dew-point comprising the steps of striating said reflecting surface and wetting said reflecting surface with water whereby said water will cohere to said striations so as to form a thin lamina of water on said reflecting surface thereby preventing water vapor to condense on said reflecting surface when the temperature of said reflecting surface is below the dew-point.

13. The method recited in claim 12 wherein said striating step comprises wiping said surface with a striating member.

14. The method recited in claim 13 wherein said striating member is comprised of nylon filaments.

15. An anti-fogging device comprising a mirror member having a hard reflecting surface and a multiplicity of fine striations contained in said hard reflecting surface where said fine striations are so disposed and arranged in said hard reflecting surface to permit water to cohere to said striations and form a thin lamina of water on said hard reflecting surface when said hard reflecting surface is wetted with water thereby preventing water vapor from condensing thereon when the temperature adjacent said lamina is below the dew-point.

16. The anti-fogging device recited in claim 15 wherein said hard reflecting surface is a glass surface.

17. The anti-fogging device recited in claim 16 wherein said fine striations have a concentration in the range of 100–500 grit.

18. The anti-fogging device recited in claim 15 wherein said hard reflecting surface is a plastic surface.

19. The anti-fogging device recited in claim 18 wherein said fine striations have a concentration in the range of 100–500 grit.

20. The anti-fogging device recited in claim 15 wherein said hard reflecting surface is a metal surface.

* * * * *